May 30, 1967  F. M. IRVING, JR., ETAL  3,322,314
STACK FORMER
Filed July 23, 1965  7 Sheets-Sheet 1

FIG. 1a

INVENTORS
FRANK M. IRVING, JR.
ALBERT S. SCHMIDT, SR.
HARRY F. POTTER
BY *Wynne + Finken*
ATTORNEYS May 30, 1967  F. M. IRVING, JR., ETAL  3,322,314
STACK FORMER
Filed July 23, 1965  7 Sheets-Sheet 4

INVENTORS
FRANK M. IRVING, JR.
ALBERT S. SCHMIDT, SR.
HARRY F. POTTER
BY *Wynne + Finken*
ATTORNEYS May 30, 1967   F. M. IRVING, JR., ETAL   3,322,314
STACK FORMER
Filed July 23, 1965   7 Sheets-Sheet 6

INVENTORS
FRANK M. IRVING, JR.
ALBERT S. SCHMIDT, SR.
HARRY F. POTTER
BY *Wynne & Finken*
ATTORNEYS

United States Patent Office 3,322,314
Patented May 30, 1967

3,322,314
STACK FORMER
Frank M. Irving, Jr., York, Albert S. Schmidt, Sr., Wormleysburg, and Harry F. Potter, Lewistown, Pa., assignors to Alto Company, York, Pa., a partnership
Filed July 23, 1965, Ser. No. 474,281
16 Claims. (Cl. 225—1)

This invention relates to a method of and apparatus for arranging bakery products for packaging.

More particularly, the invention is concerned with a machine for manipulating hamburger or hot dog rolls or like products as they are discharged from a bakery depanner apparatus and/or slicing machine, whereby the rolls are arranged in a certain manner for final packaging.

A main feature of the invention resides in the provision of a roll folding or turn-over device which receives clusters of rolls or discrete rolls from a relatively movable conveyor means and after automatically aligning the rolls laterally folds one cluster or one discrete roll over on top of another cluster or discrete roll in registering relation. Depending upon how the rolls are presented to the turn-over device, they may be folded in various ways so as to render the machine universal. That is to say, the rolls may be stacked flat bottom to flat bottom, flat bottom to rounded crusted top, or rounded crusted top to rounded crusted top.

The invention apparatus and method is further characterized by continuous movement of the rolls in one direction during the handling thereof. The rolls are caused to move relative to the folding or turn-over mechanism when approaching this mechanism and when leaving the same. Because of this, the operation is very efficient and speedy, without lost motion, and damaged or crippled products are quickly conveyed away and can never collect within the confines of the machine to cause interruption to the normal flow of the product.

An object of the invention is to take advantage of the physical characteristics of freshly baked bread, in that it does not tend to rebound or slide, as when one unit of the product is allowed to drop freely on top of another unit. When proper alignment of the product has been obtained prior to folding, a surprisingly uniform registration of the product will result after the folding operation.

Another object of the invention is to provide means for assuring clean separation of adjacent roll clusters which are frequently connected by webs of dough when they arrive at the marshaling station. Care is taken throughout the method not to destroy the integrity of the usual roll clusters of four, six or eight rolls, as the case may be.

Another important object of the invention is to effect the folding of roll clusters one upon another without tearing, abrading or otherwise damaging the tender crusts of the freshly baked rolls. This is extremely important from the standpoint of marketing, where the appearance of the product is a factor in the saleability thereof.

Another object is to provide a folding apparatus and method which produces equally good results with sliced or unsliced rolls.

Other objects and advantages of the invention will be apparent during the course of the following description.

In the accompanying drawings forming a part of this application and in which like numerals are employed to designate like parts throughout the same.

FIGURE 11 is a partly diagrammatic perspective view of the essential elements of the invention; and FIGURE 12 is a similar perspective view showing the same elements in an advanced stage of operation during the practice of the method.

Figure 1A:
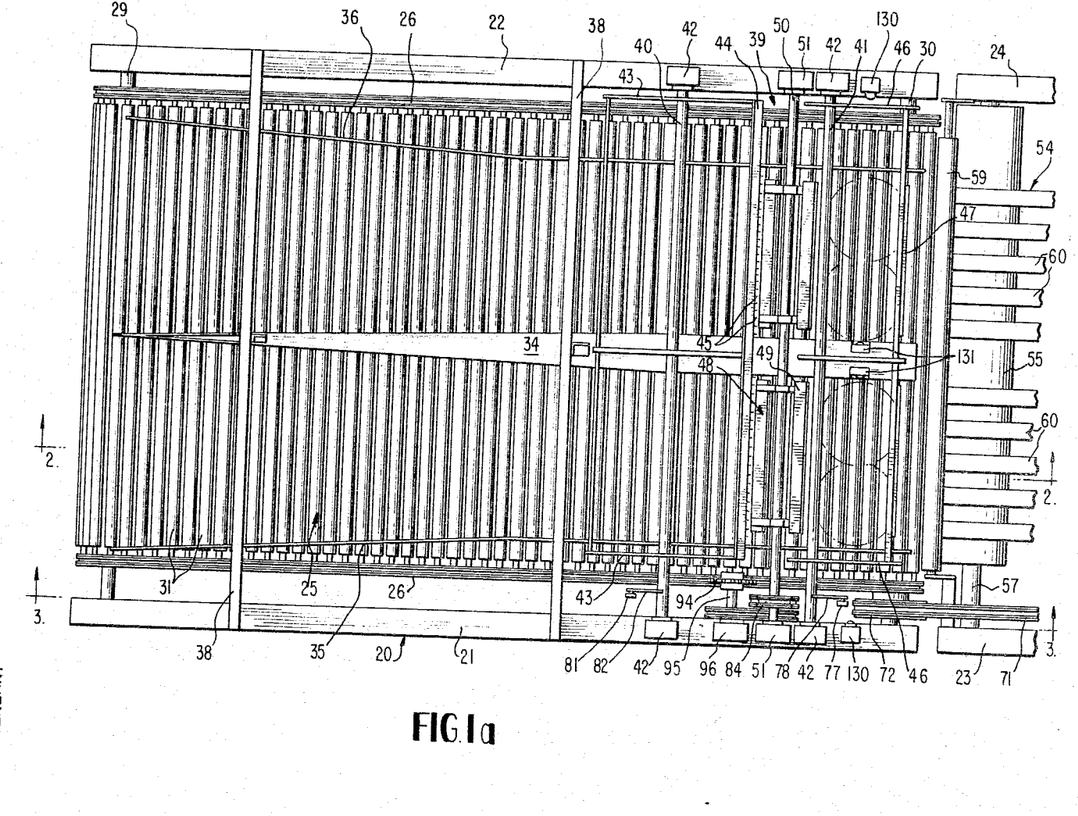
FIGURES 1a and 1b are fragmentary plan views of the invention apparatus which together constitute a complete plan view.
Figure 1B:
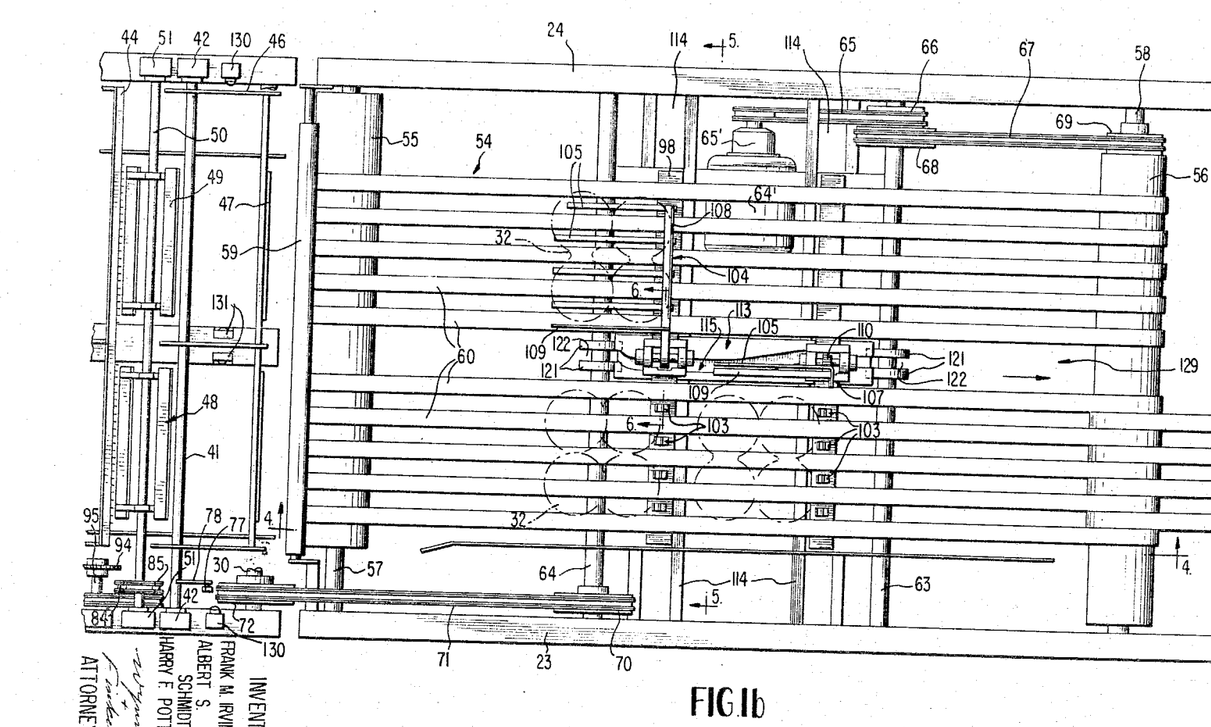

In the drawings, wherein for the purpose of illustration is shown a preferred embodiment of the invention, the numeral 20, FIGURE 1a, designates a horizontal elevated supporting frame for the apparatus including main side bars 21, 22, 23 and 24, FIGURE 1b. The side bars 21–24 are supported at the desired elevation on suitable leg means, not shown. As shown in these figures and also in FIGURES 2 and 3, the product inlet section of the apparatus comprises a roller bed endless conveyor 25 including horizontal endless drive chains 26, engaging sprocket wheels 27 and 28 carried by transverse shafts 29 and 30, having their ends suitably journaled for rotation on frame bars 21 and 22. The chains 26 carry a multiplicity of free turning relatively small transverse rollers 31 which constitute a moving bed for bakery products such as hamburger or hot dog rolls entering the apparatus from a depanner or slicing machine.

Figure 2:
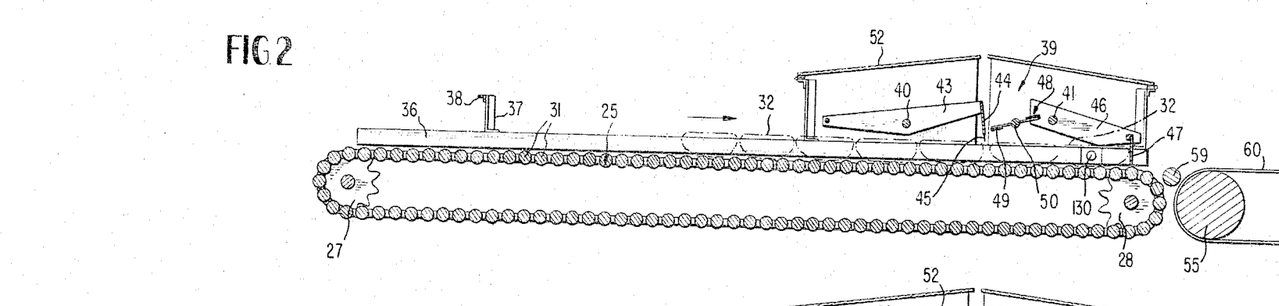
FIGURE 2 is a longitudinal vertical section taken substantially on line 2—2 of FIGURE 1a and showing one operative position of apparatus components at a roll marshaling station.
Figure 2:
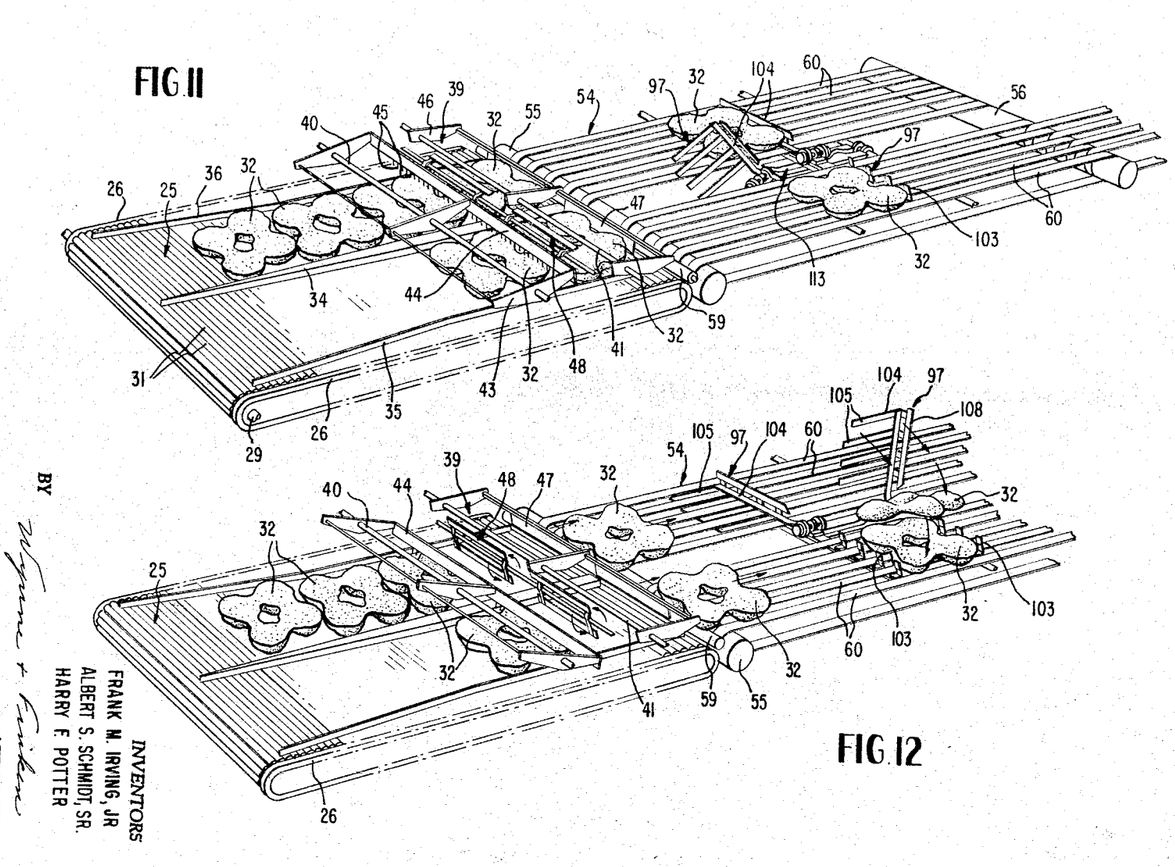

As shown in FIGURE 1a, means is provided on the entry section of the apparatus to guide and orient the product on the conveyor 25 and to arrange the product in two longitudinal columns as it approaches a product marshaling station. This means comprises a center island guide 34 and coacting laterally adjustable side guides 35 and 36. The adjustable guides 35 and 36 are suspended on brackets 37, FIGURE 2, from crossbars 38 whose end portions are secured to frame bars 21 and 22. As shown in FIGURE 2, roll clusters 32 are carried continuously by the roller bed conveyor 25 toward a marshaling station 39 where the rolls in the two longitudinal columns have their movement interrupted until such time as the folding or turn-over mechanism is properly positioned to receive the rolls. Means such as a wire screen or grid, not shown, may be arranged immediately above the portion of the conveyor 25 in advance of the marshaling station 39 to hold down to products on the conveyor 25 in the event that they tend to buckle or hump due to an accumulation of products ahead of them at the marshaling station. This is an optional feature of the machine. If this feature is employed, the hold-down screen is arranged about one-quarter of an inch above the tops of the rolls on the conveyor 25 so as to resist any upward movement thereof.

At the marshaling station 39, a pair of transverse horizontal rocker shafts 40 and 41 have their ends journaled in bearings 42 on the frame bars 21 and 22. The rocker shaft 40 carries spaced arms 43 rigid therewith, mounting at their forward ends a transverse vertically swingable stop gate or plate 44, having a multiplicity of depending pins 45 along its lower edge in closely spaced relationship.

The second rocker shaft 41 carries a plurality of arms 46 whose forward ends mount a second gate member 47 depending therefrom and adapted to swing vertically therewith, as will be further described. The purpose of the gate 47 is to interrupt the movement of rolls on the continuously moving conveyor 25 so that they will not approach the folding mechanism until the latter is in the proper position to receive them. The purpose of the gate 44 having the pins 45 is to assure that the individual roll clusters do not move forward prematurely when the gate member 47 is opened and are held firmly until a rotary paddle device, not yet described, can effect clean separation of adjacent clusters in the event that certain clusters are connected by webs of dough. The depending pins 45 of gate member 44 may, if desired, be equipped with stripper means, not shown, to assure that the pins will not lift the product when the gate member 44 is elevated.

Between the shafts 40 and 41 and gate members is a rotary paddle device 48 including radial transversely extending paddle blades 49 rigidly secured to a transverse rotatable shaft 50, the ends of which are journaled in bearings 51 on the main frame bars 21 and 22. The paddle device 48 is turned in the counterclockwise direction, FIGURE 2, one-half revolution at a time and in a properly timed manner for separating roll clusters which are proofed together as previously mentioned. The paddle device additionally advances laterally aligned pairs of clusters 32 toward the folding mechanism at the proper time. The operation of the paddle device 48 is timed and coordinated with the operation of the gate members 44 and 47.

Figure 3:
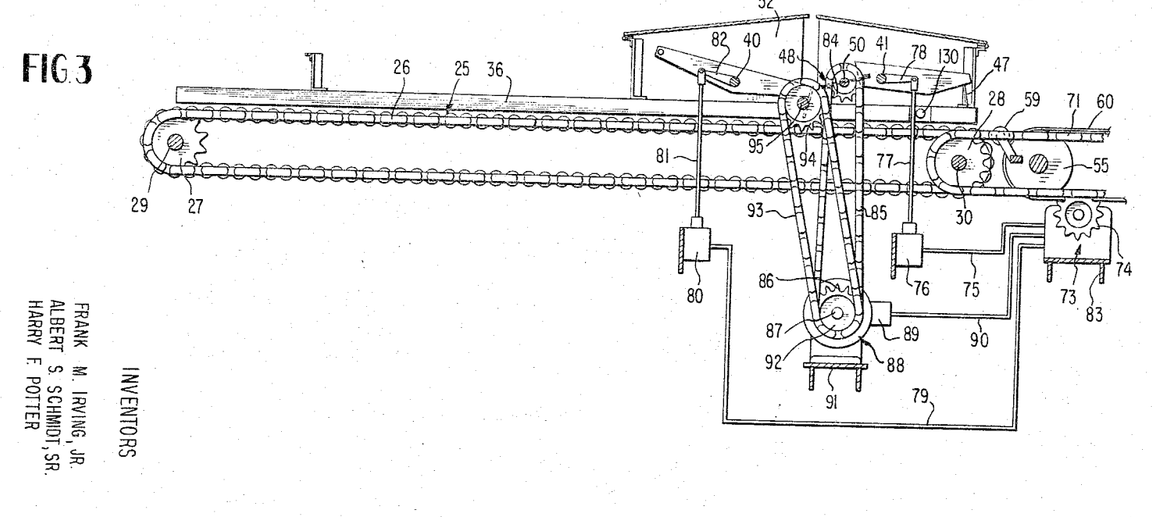
FIGURE 3 is a partly diagrammatic longitudinal vertical section taken on line 3—3 of FIGURE 1a and showing a second position of components at the marshaling station.

For reasons of safety, there is preferably provided a housing 52 spanning the entire marshaling station 39, FIGURES 2 and 3. This housing has been omitted in the other drawing figures for clarity. The top wall of this housing is formed of open wire mesh or some transparent material so that an operator can observe the gates 44 and 47 and the paddle device and make any necessary corrections.

Longitudinally beyond the marshaling station 39, the machine further comprises a second belt conveyor section 54 including a pair of transverse end rolls 55 and 56 carried by shafts 57 and 58, journaled for rotation on the main frame bars 23 and 24. As shown in FIGURES 2 and 10a–10d, the conveyors 25 and 54 have their top runs at the same elevation so that the bakery products may pass readily from the roller bed conveyor onto the belt conveyor. There is preferably a small intermediate powered or unpowered transfer roller 59 between the two conveyor sections to assure a smooth cross-over of each cluster of rolls. The roller 59 is suitably supported upon the bars 23 and 24.

The conveyor 54 consists of a plurality of relatively narrow spaced parallel belts 60, arranged in two laterally spaced groups. The belts preferably number ten or twelve. The belts 60 are preferably about one inch wide and they are spaced apart about one inch. All of the belts engage the rollers 55 and 56, and the belts serve to advance the roll clusters 32 which are delivered thereto at proper times by the paddle device 48.

Figure 4:
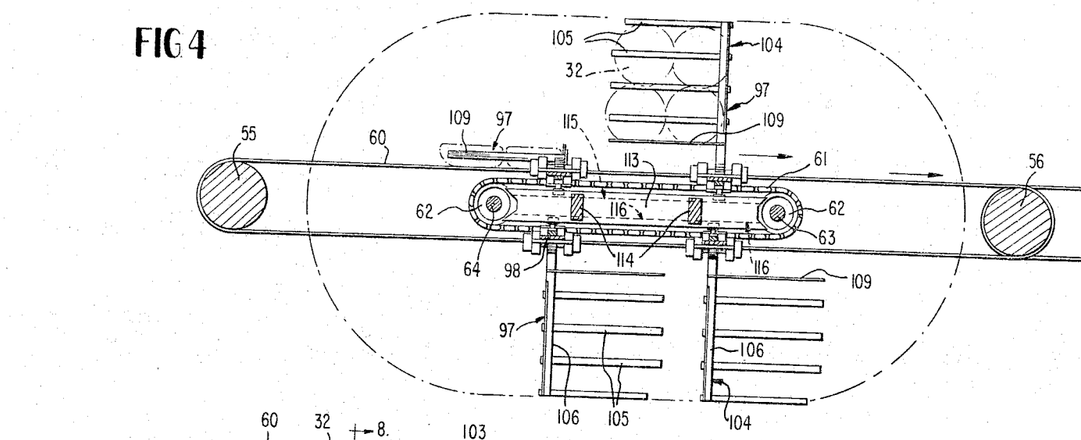
FIGURE 4 is a fragmentary vertical longitudinal section taken on line 4—4 of FIGURE 1b.
Figure 5:
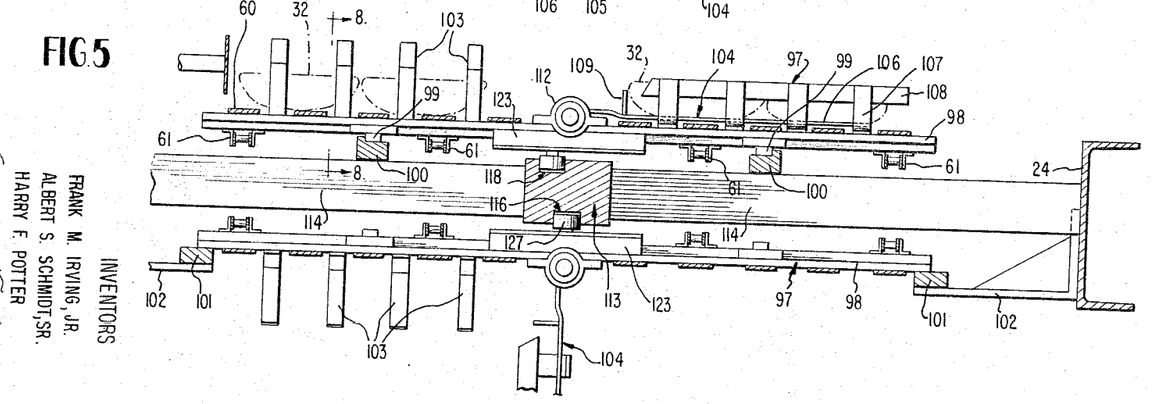
FIGURE 5 is an enlarged fragmentary transverse vertical section taken on line 5—5 of FIGURE 1b.

Operating in conjunction with the belts 60, FIGURES 1b, 4 and 5, are a plurality of spaced parallel endless chains 61, preferably four in number, engaging sprocket wheels 62 on transverse horizontal shafts 63 and 64, which have their ends supported for rotation on the frame bars 23 and 24. The chains 61 and the shafts 63 and 64 lie bodily within the confines of the belts 60, as shown in FIGURE 4. The shafts 63 and 64 are spaced approximately equal distances from the rollers 55 and 56 and the shafts are arranged about midway between the top and bottom runs of the belts 60. The shafts 63 and 64 are adapted to power the several chains 61 in unison and in the same direction of movement as the belts 60 but at a somewhat slower speed than the belts. The number of chains utilized may be varied within the scope of the invention.

In order to drive the several conveyor means, a main motor 64′ having a speed reducer 65′ is preferably mounted below the main frame 20, near the floor. This motor continuously drives a sprocket chain 65, FIGURE 1b, engaging a sprocket gear 66 on shaft 63 to directly power the several chains 61. All other moving parts of the apparatus derive their power from the driven shaft 63. For example, another sprocket chain 67 and sprocket gears 68 and 69 on shafts 63 and 58 transmit power to the roller 56. The roller 56 in turn drives the several belts 60 in the same direction as the chains 61 but at a somewhat greater rate of speed for an important purpose to be described. In like manner, a sprocket gear 70 on one end of shaft 64 engages a chain 71 which engages a sprocket gear 72 on the shaft 30 of conveyor 25 to drive the latter.

As shown in FIGURE 3, a cycle timer or cycling switch 73 of a generally conventional type, has an input sprocket gear 74 meshing with the bottom run of chain 71, near and below roller 55. The chain 71 therefore operates the timer 73. The timer is electrically connected in a conventional manner by a wire 75 with a suitable solenoid device 76, in turn connected with a link 77, the top of which is pivotally connected to a crank 78 on rocker shaft 41 to cause turning of the same at desired times. Similarly, the timer 73 is connected by another wire 79 with another solenoid device 80 which is connected by a link 81 with a crank 82 on the aforementioned rocker shaft 40. The timer 73 is supported on a bracket 83, connected to the main frame 20 and the solenoid devices 76 and 80 may be similarly mounted.

The solenoid devices as illustrated are direct push-pull actuators for the rocker shafts 41 and 40. It is also contemplated to employ a pair of solenoid-operated air valves which in turn control air operated cylinders having pistons, the latter being connectable to the arms or cranks 78 and 82.

To complete the power train of the apparatus, the shaft 50 of paddle device 48 carries a sprocket gear 84 connected with a vertically extending sprocket chain 85 whose lower end engages a sprocket gear 86 on the shaft 87 of a one-half revolution clutch or driver 88 for the paddle device 48. The clutch 88 is intermittently activated or energized by a solenoid 89, electrically connected with the timer 73 by a wire 90 and therefore under the direct control of the timer. The one-half turn clutch 88 is secured to a bracket 91, suitably mounted upon the main frame of the apparatus.

While de-energized or inactive with respect to the paddle device 48, the shaft 87 of clutch 88 may turn continuously under influence of a sprocket gear 92 thereon, driven by an endless chain 93 having its upper end engaging a sprocket gear 94, engaging the top run of adjacent chain 26, FIGURE 3. The sprocket gear 94 is carried by a stub shaft 95, held in a bearing 96 on the adjacent frame bar 21, FIGURE 1a. It should now be clear that the roller bed conveyor 25, belt conveyor 54, and drive chains 61 are all operated in unison at the required speeds by the main drive motor 64′. Power is taken off at the desired points on these conveyors to operate the timer device 73 which in turn controls the operation of the instrumentalities shown in FIGURE 3 as well as the basic cycle of operation of the machine.

It is also contemplated to have the timer control the operation of a master relay, which in turn conditions circuitry which will operate the two gates 44 and 47 and the paddle device 48 is proper sequence, i.e., rear gate 44 closes, front gate 47 opens and paddle device 48 revolves one-half turn. This master relay and associated circuitry have not been illustrated in the drawings for the purpose of simplicity of illustration.

Referring to FIGURES 1b, 4 and 5, the chains 61 have attached to them for movement therewith roll cluster folding or turn-over units 97 which may be four in number, as shown, or five in number. The units 97 are spaced apart equidistantly on the chains 61, and they form the direct means for folding each individual roll cluster 32 in one column over onto a laterally aligned cluster in the other column to produce the desired stacked relationship such as flat bottom to flat bottom, flat bottom to rounded top, or rounded top to rounded top. This relationship will depend upon the disposition of the clusters as they engage the turn-over or folding units 97.

Each unit 97 comprises a transverse horizontal carriage bar 98, directly fastened with bolts or the like to the outer sides of the chains 61. Each bar 98 extends across the several chains at right angles thereto. A pair of runners or slides 99 on the bottom of each bar 98 slidably engages fixed guide rails 100 extending longitudinally between pairs of the chains 61 and suitably rigidly connected to the machine main frame. The rails 100 not only aid in guiding the folding units 97 longitudinally but also bear the weight of the units moving with the upper runs of the chains. When the units 97 are on their return travel with the lower runs of chains 61, FIGURES 4 and 5, their weights are borne by rails 101 which slidably engage the extremities of the carriage bars 98. The rails 101 are rigidly secured to brackets 102 which are in turn mounted upon the main frame bars 24, etc.

Each bar 98 has on one side thereof a plurality of upstanding reversely inclined stop fingers 103, adapted to arrest the travel of roll clusters moving with the belts 60 when the clusters overtake the particular unit 97 moving at a somewhat slower speed. The reverse inclination of the fingers 103 relative to the moving rolls tends to prevent the rolls from upsetting when they engage the stop fingers.

Each folding unit 97 further embodies a folding or turn-over arm 104, including reversely extending horizontal longitudinal tines 105 and a forward transverse bar 106. The bar 106 carries a plurality of upstanding vertical stop extensions 107 having a transverse stop bar 108 secured thereto at their upper ends. The elements 107 and 108 are aligned laterally with the fingers 103 so as to assure accurate lateral alignment of adjacent pairs of clusters 32 prior to folding or turning-over. A side upright stop plate 109 is also rigidly secured to each bar 106 and extends rearwardly thereof, parallel to the tines 105 and spaced inwardly of the tines. This stop plate 109 assures that each roll cluster in one column as it is lifted for folding onto a laterally opposite cluster will be held momentarily in the exact position to assure good registration with the underlying cluster when allowed to fall freely on to the same, as will be further described.

Figures 6, 7, 8, 9:
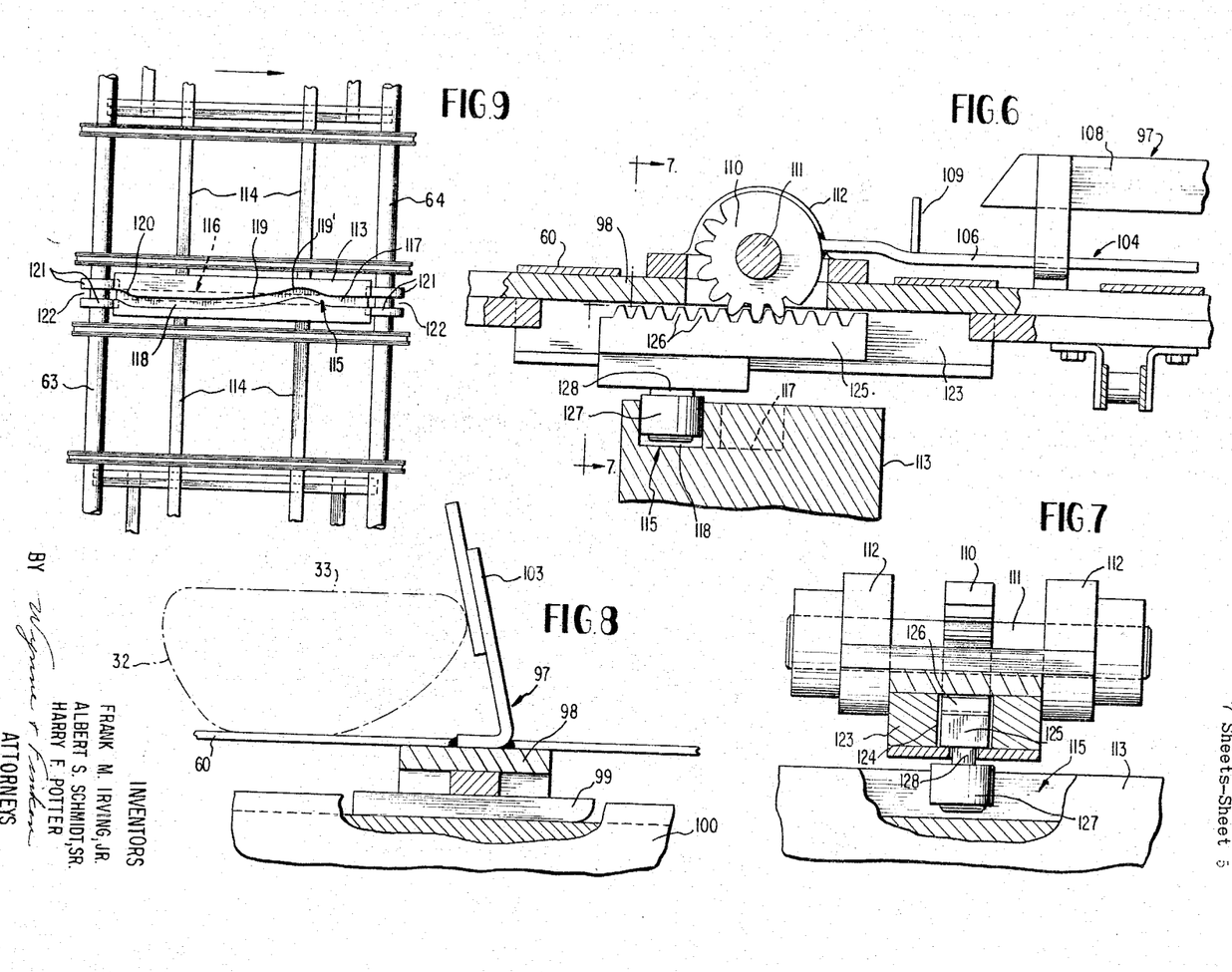
FIGURE 6 is an enlarged fragmentary vertical section taken on line 6—6 of FIGURE 1b.
FIGURE 7 is a fragmentary section taken on line 7—7 of FIGURE 6, partly broken away.
FIGURE 8 is an enlarged fragmentary vertical section taken on line 8—8 of FIGURE 5.
FIGURE 9 is a fragmentary plan view of a cam and associated elements, parts omitted for clarity.

As shown in FIGURE 6, the inner extremity of each bar 106 is rigidly secured to a gear sector 110, rigid with a short shaft 111 whose end portions are journaled in bearings 112, rigidly secured to the bar 98. Each folding arm 104 is therefore bodily swingable vertically about the longitudinal axis of the shaft 111. As shown most clearly in FIGURE 5, each bar 98 travels beneath the belts 60 and the stop fingers 103, extensions 107 and tines 105 pass between the belts. When the arm 104 is horizontally disposed, the tines 105 are substantially flush with or slightly below the top faces of the belts 60 so that the roll clusters 32 pass over and onto the tines with the belts 60 and into engagement with the stop bar 108.

To cause the folding or turning-over operation which is the primary purpose of the invention, a stationary cam plate 113 is rigidly held by transverse horizontal mounting arms 114, which extend inwardly from opposite sides of the machine main frame and are secured thereto. The cam plate 113 and its support bars 114 are arranged between the shafts 63 and 64, FIGURE 4, and within the chains 61, as shown.

The cam plate 113 has generally longitudinal cam slots 115 and 116 in its upper and lower sides respectively, FIGURE 5. The lower cam slot 116 is straight throughout the length of the cam plate and at the transverse center thereof. The upper cam slot 115 has a straight section 117 directly above the slot 116 and also has a rearward laterally offset longitudinal section 118 connected with the slot section 117 by a gradually curving diagonal slot section 119 and a reversely offset curved loop 119'. A more abrupt diagonal cam slot portion 120 on the upper side of the cam plate leads back into alignment with the central slot section 117 and the underlying straight slot 116 shown by the dotted lines in FIGURE 9. As shown in this figure, each shaft 63 and 64 has fixed thereon near its center a pair of spaced collars 121, forming between them a continuous groove 122 which forms a continuation of the cam slots 115 and 116 at the ends of the cam plate 113.

Each unit 97, FIGURE 6, embodies a guide channel 123 rigid therewith and secured to the bottom of carriage bar 98 and having a passage 124, within which is slidably mounted a rack bar 125 having gear teeth 126 in mesh with the teeth of sector 110. A cam follower roller 127 rotatably mounted on a pin extension 128 of the rack bar 125 engages within the upper cam groove 115 and is adapted to enter the lower groove 116 when the particular unit 97 passes to the lower return side of the chains 61. The cam follower 127 passes through the space between the collars 121 during transition from the upper to the lower side of the conveyor structure and therefore the follower and turnover arm is subjected to positive control at all times during the complete cycle of operation.

It may be seen in FIGURES 6, 9, 11 and 12 that when the follower 127 is in the lower cam slot 116 or within the passages 122 or within the upper slot section 117, the turn-over arm 104 is in a true vertical position. However, when the follower 127 leaves the adjacent passage 122 and enters the abrupt diagonal slot section 120, the turn-over arm 104 swings downwardly rather abruptly to the horizontal and continues in this position while the follower is in the offset slot section 118. When the follower 127 enters the diagonal slot section 119, the arm 104 begins to swing upwardly to a vertical position and continues to swing until it is somewhat beyond the true vertical when the follower enters the curved slot portion 119'. The arm 104 will swing back to a true upstanding vertical position when the follower 127 reaches and enters the slot section 117.

As stated, when the follower 127 is in the bottom cam slot 116, the turn-over arm 104 is vertical and depends from the bar 98 which is now inverted. This vertical position of each turn-over arm while passing around shafts 63 and 64 and along the bottom of the apparatus is necessary because of the relatively narrow passage 129, FIGURE 1b, between the two groups of belts 60, through which each turn-over arm must move when a unit 97 moves from the top to the bottom of the apparatus and vice versa. This path of travel is depicted by the broken line shown in FIGURE 4 and also in FIGURES 10a–10d.

It should now be clear that the folding or turn-over arm 104 of each traveling unit 97 is controlled automatically and positively during the complete cycle of operation with chains 61. As will presently be made clear, the operation of the units 97 is automatically coordinated with gate members 44 and 47 and paddle device 48, and because of this there is no lost motion in the apparatus and the maximum number of product units can be handled efficiently in a minimum time.

The operation of the invention is as follows:

When the main drive motor 64' is operating, the chains 61 are driven at the prescribed speed through chain 65, sprocket gear 66 and shaft 63. Simultaneously, through sprocket gears 68 and 69 and associated chain 67 and roll 56, the belts 60 are driven in the same direction as the chains 61 but at a somewhat greater speed. Power is taken off from the shaft 64 by sprocket gear 70 and chain 71, and the latter drives sprocket gear 72 on shaft 30 to operate roller conveyor 25 at the proper speed and in the same direction as the belts 60. All of the conveyor sections of the apparatus are driven in unison at the prescribed speeds by the single motor 64' and associated gearing.

It may also be noted that while the endless chain 71 is moving, the gear 74 of timer 73 in mesh therewith is continuously driven. The sprocket gear 94, FIGURE 3, is also continuously driven, being in mesh with the adjacent endless chain 26. This continuously turns the shaft 87 and sprocket gear 86 of clutch unit 88, the latter being connected to the paddle device 48 by chain 85 and associated elements, as previously described.

With the apparatus thus operating, the roll clusters 32, discrete rolls or other like product units are delivered in from a depanner and/or slicer onto the conveyor 25 in a more-or-less continuous manner. The center island guide 34 and side guides 35 and 36 after proper adjustment assure that the rolls are in two parallel rows on the conveyor 25 as they approach the marshaling station 39. Initially, FIGURES 2 and 11, the gate member 44 is elevated so that the roll clusters may pass thereunder, and the gate member 47 is lowered to interrupt the forward movement of the leading laterally aligned pair of clusters 32 moving with the conveyor 25.

Figures 10A, 10B, 10C, 10D:
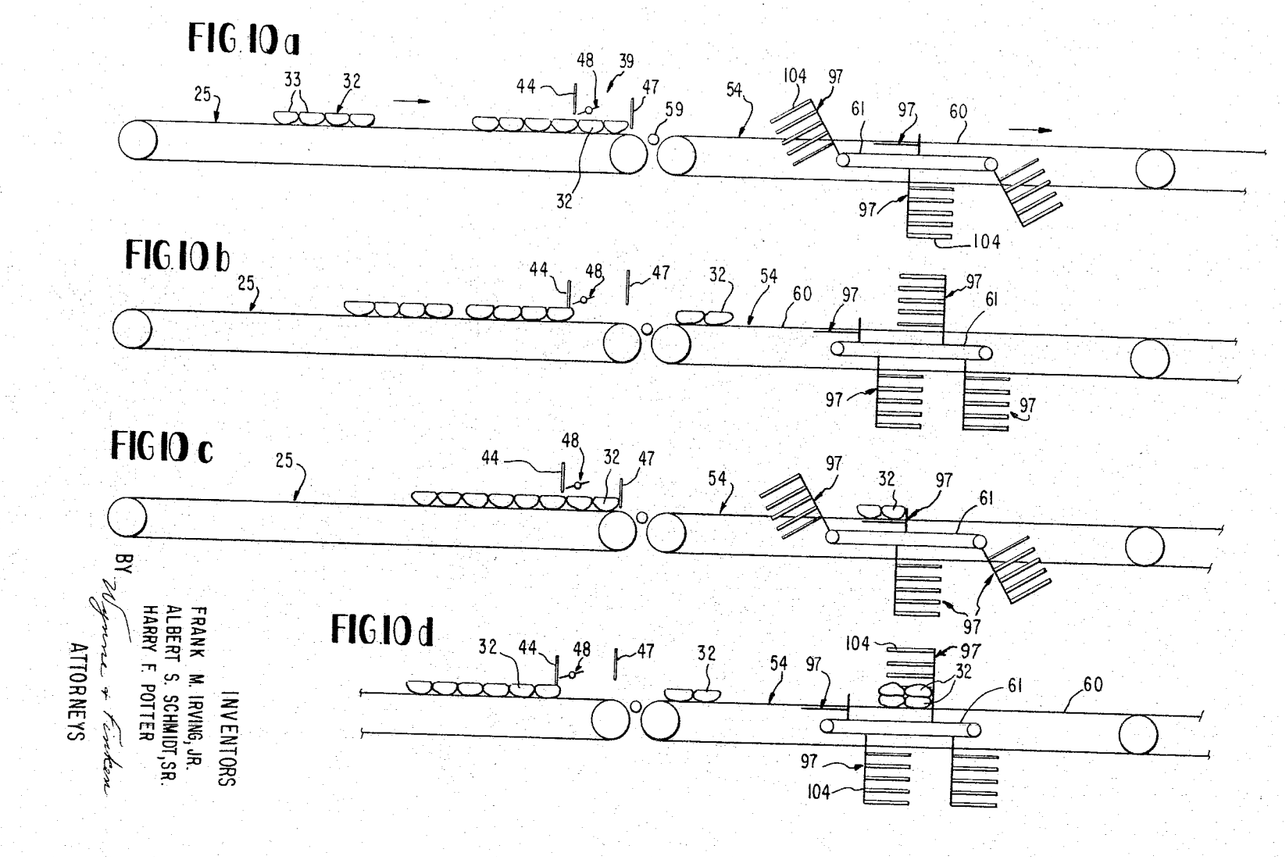
FIGURES 10a–10d are diagrammatic side elevational views illustrating the relative movements between major apparatus components and roll clusters during the operation of the apparatus.

Upon reaching the marshaling station 39, FIGURES 2, 10a and 11, while gate member 47 is down to interrupt its movement, the leading pair of clusters 32 has its presence sensed or detected by a pair of photoelectric eyes 130, outwardly of the roll clusters and coacting light sources 131 inwardly thereof, see FIGURES 1a and 1b. That is to say, when both leading roll clusters 32 enter the marshaling station 39 and engage the gate member 47, both light beams from the sources 131 will be interrupted by the clusters and the photoelectric eyes will be de-energized and will thus sense the presence of the leading pair of roll clusters. If there is no roll cluster between either light source 131 and associated eye 130, due to uneven delivery from the deepanner or for other reasons, the apparatus will not be automatically conditioned for further processing of the rolls. The main motor 64' will be allowed to continue in operation without the timer 73 dictating any subsequent machine operation until a complete pair of the clusters 32 is detected at the station 39. The electrical wiring may be entirely conventional and has been omitted for simplicity and because it is not necessary for a proper understanding of the invention.

When a pair of roll clusters 32 has been detected by the photoelectric means at the station 39, the timer 73 will immediately begin to dictate and control the remainder of the automatic cycle of operation of the machine. As one of the continuously moving turn-over units 97, FIGURES 11 and 10a, begins to rise between the rearward portions of the belts 60 and thus approaches a position where it is able to receive leading cluster 32, the timer 73 dictates the elevation of gate member 47 and the substantially simultaneous lowering of gate member 44. More particularly, the timer 73 causes solenoid 76, FIGURE 3, to be energized for pushing link 77 upwardly and turning crank 78 and rocker shaft 41 in the direction to elevate gate member 47. Similarly, the timer 73 energizes solenoid 80 which pulls down link 81 and turns crank 82 and rocker shaft 40 in the proper direction to lower gate member 44. Also, substantially simultaneously, the timer 73 energizes solenoid 89 on half turn clutch 88 causing the same to be active for a sufficient time interval to rotate paddle device 48 one-half turn counterclockwise to positively discharge the two leading clusters 32, after which the clutch 88 is immediately inactive, even though the chain 93 and associated parts continue to move.

As this sequence of operation takes place quickly, the leading two clusters of rolls are propelled from the marshaling station 39 into conveyor section 54, as shown in FIGURE 12 and FIGURE 10b, so that they may advance toward the turn-over unit 97 immediately in front of them, now properly positioned to receive a pair of clusters. Since the gate member 44 is down while the padddle device 48 propels the leading clusters forwardly, these clusters are cleanly separated from the next-rearmost pair, in the event that the latter are connected to the leading clusters by webs of dough. The pins 45 penetrate the connecting doubh webs, if present, when gate member member 44 is down, and the movement of the paddle device 48 separates the leading pair of clusters cleanly as the rows of following clusters are held back.

Further cycling of the timer 73 causes the gate 44 to return to the elevated position of FIGURE 11 and the gate member 47 to be lowered, as shown, whereby the next pair of roll clusters 32 may advance to the marshaling station 39. At this station, while the rolls are held by gate member 47, the rollers 31 turn freely beneath the clusters without injuring or abrading their tender crusts.

The leading pair of roll clusters 32 which have now advanced onto the continuously moving belt 60 will travel with these belts at a sufficient speed to overtake the continuously moving turn-over unit 97 carried by chains 61. The cam follower 127 has now entered the offset slot section 118, thus causing the turn-over arm 104 to assume the horizontal position shown in FIGURES 10c and 12. The tines 105 are slightly below the belts 60 and the stop fingers 103 and plate 108 now project above the belts 60, as shown. The forward movement of the roll clusters with the belts 60 is arrested by engagement of the rolls with the elements 108 and 103. Immediately thereafter, the cam follower 127 enters the slot section 119 and begins to swing upwardly to the vertical and somewhat beyond the vertical when the cam follower enters the offset slot section 119'. This condition is illustrated in FIGURE 12 and also in FIGURE 10d. The roll cluster 32 on the tines 105 is elevated by the turn-over arm 104. When such arm approaches the vertical, the cluster 32 thereon, FIGURE 4, will momentarily be supported by the plate or stop 109 which is then in a horizontal position. The arm 104 then continues slightly beyond the vertical, FIGURE 12, and the cluster 32 carried thereby drops from the arm 104 and falls freely onto the underlying cluster 32 which is engaged against the stop fingers 103. Since these fingers are always in lateral alignment with the element 108 and since the lateral spacing of the pair of clusters has been accurately established by the longitudinal guiding means, proper registration of the two stacked roll clusters, FIGURES 12 and 10d, is assured.

After completing the turning-over operation, the arm 104 immediately returns to the true vertical by entry of the cam follower 127 into slot section 117. Quickly thereafter, the follower passes between the elements 121 and around the shaft 64 to enter the bottom cam slot 116. As previously explained, the arm 104 remains vertical and depending while passing rearwardly beneath the conveyor section 54 and until it again emerges upwardly around shaft 63 to enter the diagonal slot portion 120 which causes the arm 104 to swing down toward the horizontal.

It should be kept in mind that as the apparatus functions continuously, the several turn-over units 97 continue to circuit with their carrier chains 61 and additional units 97 are continually presenting themselves to receive additional pairs of clusters 32 without lost time and motion. This allows the timer 73 and associated elements shown particularly in FIGURE 3 to advance additional pairs of clusters 32 from the marshaling station 39 onto the belts 60 at precisely the correct times to be received by the turn-over units without loss of time and motion. As explained, whenever one or both sides of the station 39 have no roll clusters therein due to uneven feeding or interrupted feeding from the depanner and the light beams to either or both of the sensing eyes 130 are not interrupted, the action of the paddle device 48 and associated gates will not be dictated by the control timer 73 until such time as two clusters do enter the station 39 and engage the down gate member 47 and interrupt the light beams. Until this occurs, the belts 60 and the chain 61 simply continue to run or idle.

As each turn-over unit 97 descends to the lower side of the apparatus, the stacked pair of clusters 32 now on the right hand group of belts 60, FIGURE 12, travel forwardly with these belts which convey the stacked rolls to final packaging equipment, not shown.

The complete cycle of operation is best illustrated by FIGURES 11 and 12. Diagrammatic FIGURES 10a–10d show the operating cycle for a single pair of roll clusters between the time when they enter the marshaling station 39 and are subsequently stacked in superposed relation by the particular turn-over unit 97. These diagrammatic views further illustrate the relative movements of the main elements of the invention and the relative movements between the apparatus parts and the clusters or product units during a complete cycle of operation.

It is to be understood that the form of the invention herewith shown and described is to be taken as a preferred example of the same, and that various changes in the shape, size and arrangement of parts may be resorted to, without departing from the spirit of the invention or scope of the subjoined claims.

The invention having been described, what is claimed is:

1. A method of arranging bakery product units comprising conveying rows of said units to a marshaling station, laterally aligning a forward group of said units, propelling the resultant aligned forward group from said marshaling station, restraining the next rearward group during said propelling action, and stacking a unit from one row of the propelled group onto a transversely adjacent unit in an adjacent row whereby pairs of units are stacked.

2. A method as defined in claim 1 and including at least a partial severing of any connecting dough webs between units in a row, said severing being accomplished to facilitate the propelling of the forward units.

3. Apparatus for arranging bakery product units comprising conveyor means for advancing rows of said units through a marshaling station, means for laterally aligning a forward group of units at said marshaling station, positive discharge means responsive to an aligned group of forward units for propelling said aligned group from said marshaling station, restraining means for preventing forward movement of any units into said positive discharge means during the propelling action, and stacking means for stacking a unit from one row of the propelled group onto a transversely adjacent unit in an adjacent row whereby pairs of units are stacked.

4. Apparatus as defined in claim 3 and including means for at least partially severing any connecting dough webs between units in a row to facilitate the propelling action.

5. Apparatus for arranging bakery product units for subsequent packaging comprising continuously moving substantially horizontal conveyor means adapted to advance laterally opposed rows of said units continuously in one direction, and product turn-over means moving continuously in the same direction as the conveyor means but at a different rate of speed than the conveyor means and adapted during movement of the product units on the conveyor means to lift and turn-over product units in one of said rows on top of product units in the other row.

6. Apparatus for arranging bakery product units for packaging comprising continuously moving substantially horizontal conveyor means adapted to advance spaced parallel rows of bakery product units toward a packaging station, a second continuously moving conveyor means adjacent the product unit conveyor means and traveling in the same direction as the product unit conveyor means but at a slower rate of speed than the product unit conveyor means, and a plurality of spaced product turn-over devices on said second conveyor means and adapted during continuous movement of the product units to lift and turn-over product units from one row and deposit them on top of laterally adjacent units in the other row so that pairs of the product units are stacked in substantially registering relation for packaging.

7. Apparatus for arranging bakery product units for packaging comprising a product unit conveyor including laterally spaced endless conveyor belt means having a passage formed therebetween, an endless turn-over mechanism conveyor operating inside of the confines of the product unit conveyor, means to drive the product unit and turn-over mechanism conveyors continuously in the same direction and at different rates and with the product unit conveyor moving faster than the turn-over mechanism conveyor, a plurality of turn-over mechanisms carried by said mechanism conveyor in spaced relation thereon and each including a carriage part and a swingable turn-over arm, cam means adjacent the turn-over mechanism conveyor, and a follower element on each turn-over mechanism connected with the turn-over arm of such mechanism and engaging the cam means during movement of the turn-over mechanism with said mechanism conveyor, said turn-over arms adapted when vertically disposed to travel within said passage.

8. Apparatus for arranging bakery roll clusters for packaging comprising a continuously moving endless roll cluster conveyor including laterally spaced groups of conveyor belts, each group adapted to convey a row of roll clusters, a second endless conveyor means operating within the confines of the roll cluster conveyor and moving continuously in the same direction as the roll cluster conveyor but at a slower rate of speed, carriage bars on the second conveyor means transversely of said groups of conveyor belts and beneath the belts, upstanding roll cluster stops on the carriage bars extending between the belts of one group, vertically and laterally swingable roll cluster turnover arms pivoted to the carriage bars near their centers and adapted in one position to lie horizontally adjacent to the belts of the other group and having lifting tines extending between the belts of the other group and an upstanding roll cluster stop in lateral alignment with the first-named stops, a cam for controlling the movement of the turn-over arms arranged within said second endless conveyor means and having grooves in its top and bottom faces, and follower elements on said carriage bars engaging said grooves and operatively connected with the turn-over arms to cause them to swing between generally horizontal and generally vertical positions during passage of the carriage bars with the second endless conveyor means around said cam.

9. The invention as defined by claim 8, and wherein the groove in the bottom of said cam is a substantially straight longitudinal groove and the groove in the top of said cam is irregular with longitudinal portions and laterally offset portions, whereby said followers while engaging the bottom straight groove maintain the turn-over arms substantially vertically disposed and while engaging said top irregular groove cause the turn-over arms to swing from vertical positions to substantially horizontal positions and then to positions beyond the vertical and then back to vertical positions.

10. The invention as defined by claim 8, and wherein the connection between each follower element and turn-over arm comprises a gear sector on the turn-over arm, and a rack bar carried by the follower element and mounted for reciprocation upon the carriage bar.

11. A method of arranging bakery product units for packaging comprising conveying plural product units to a marshaling station, arresting the movement of the product units at the marshaling station and arranging the units in laterally spaced aligned pairs at the marshaling station, releasing pairs of the product units in succession at said station and advancing the released pairs of units therefrom continuously toward packaging machinery, engaging the leading edges of each advancing pair of product units to further align them laterally while they continue to advance, lifting one unit of each pair and turning such unit over onto the other unit of the pair in superposed contacting relation while continuing to convey the pair toward said packaging machine.

12. A method of handling bakery products prior to packaging comprising marshaling pairs of product units to coordinate their movement with continuously moving manipulating means, releasing pairs of product units and advancing them toward the manipulating means in the same direction of movement with the manipulating means and at a greater speed than the manipulating means when said means is conditioned to receive the product units, and then operating the manipulating means during continued movement of the product units and manipulating means in the same direction to turn-over one product unit on top of the other unit in each pair and continuing to convey each pair of product units after said turning-over operation.

13. The invention as defined by claim 12 and wherein said one product unit during the operation of the manipulating means is elevated from a substantially horizontal position to a position somewhat beyond the vertical and allowed to fall freely on top of said other product unit while both units continue to move in one direction.

14. A method of handling bakery product units prior to packaging comprising conveying rows of said product units to a marshaling station and interrupting the movement of the rows at said station, releasing each leading pair of product units in said rows at said station and advancing each released pair from said station while holding back the remainder of said rows and thereby cleanly separating each leading pair from said rows, engaging the leading ends of each advancing pair of said product units to align them laterally, and turning one unit of each aligned pair over on top of the other unit in substantially registering relation while continuing to advance the units.

15. Apparatus for arranging bakery product units for subsequent packaging comprising a first conveyor for moving rows of the product units to a marshaling station, movable gate means at the marshaling station operable to arrest the movement of said rows, means at the marshaling station to detect the presence of each leading pair of product units in said rows at said station, means activated by said detecting means to release each leading pair of product units and to propel each leading pair from the marshaling station while allowing the next rearmost pair of product units to enter the marshaling station, a second conveyor receiving each pair of product units propelled from the marshaling station and carrying each pair away from said station, and means movable relative to the second conveyor and the product units thereon and operable to engage each pair of product units and to turn-over one unit of the pair on top of the other unit so that each pair is in stacked relation for packaging.

16. The invention as defined by claim 15, and wherein the last-named means comprises a third conveyor device traveling in the same direction with the second conveyor at a slower speed than the second conveyor, and a plurality of spaced product turn-over mechanisms on the third conveyor device each having a vertically swingable turn-over arm, and relatively stationary cam means engaging a part of each turn-over mechanism to operate the turn-over arm thereof.

References Cited
UNITED STATES PATENTS

| | | | |
|---|---|---|---|
| 2,667,259 | 1/1954 | Parker | 198—35 X |
| 2,853,961 | 9/1958 | Oakes | 198—33 |
| 3,106,048 | 10/1963 | Marasso | 53—123 |

EVON C. BLUNK, *Primary Examiner.*

EDWARD A. SROKA, *Examiner.*